United States Patent Office 2,693,854
Patented Nov. 9, 1954

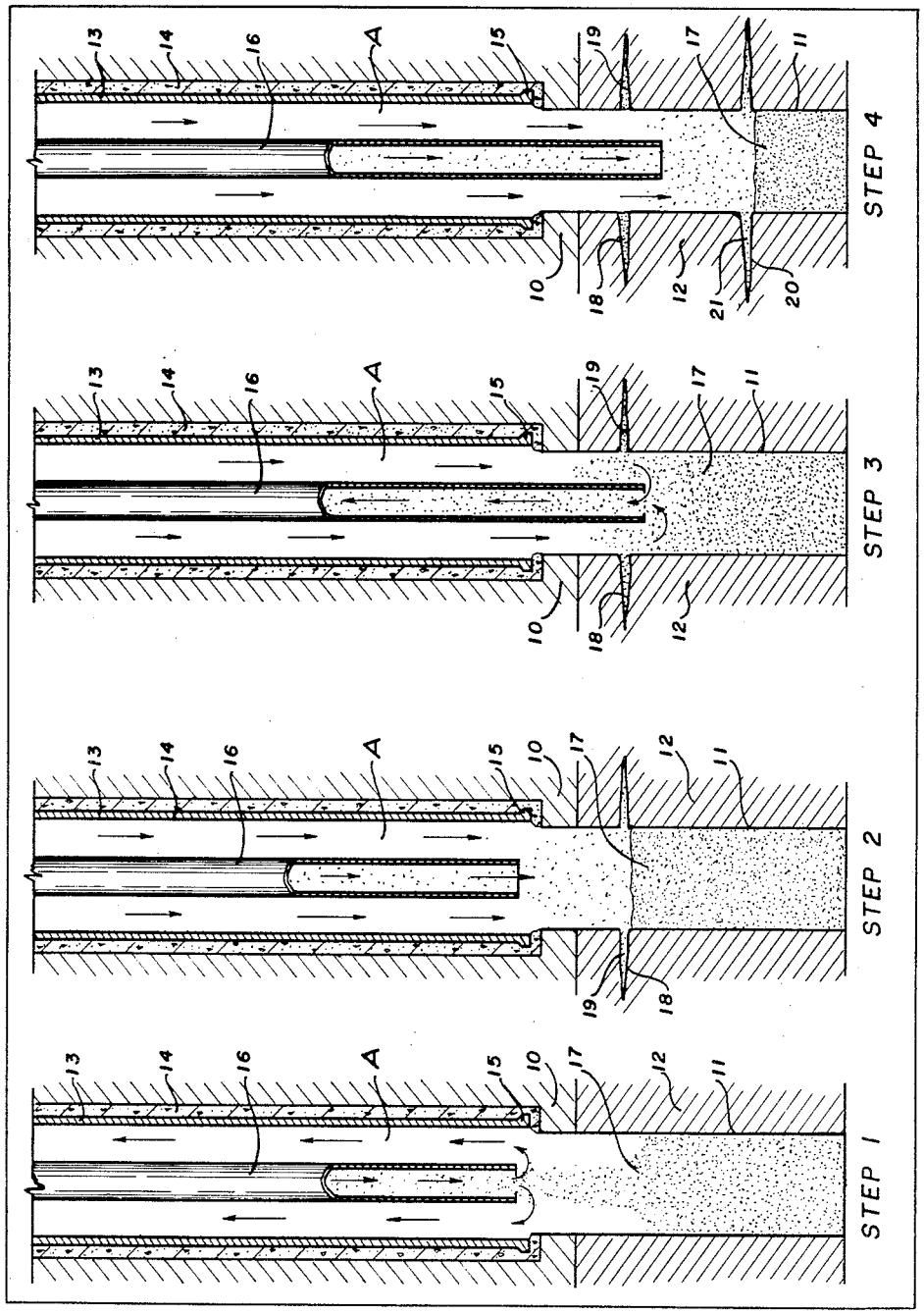

2,693,854

FORMATION OF ZONES OF HIGH PERMEABILITY IN LOW PERMEABILITY FORMATIONS

Guss F. Abendroth, Shreveport, La., assignor, by mesne assignments, to Standard Oil Development Company, Elizabeth, N. J., a corporation of Delaware Application April 16, 1952, Serial No. 282,637

6 Claims. (Cl. 166—15)

The present invention is directed to a method for selectively fracturing a low permeability formation. More particularly, the invention is directed to a method for forming a plurality of zones of high permeability in a low permeability formation traversed by a well. In its more specific aspects, the invention is directed to a method for forming a plurality of zones of high permeability in a low permeability formation traversed by a well in a sequence of operations which allows a plurality of high permeability zones to be formed and product to be obtained therefrom.

The present invention may be described briefly as involving the sequence of operations in which a plurality of zones of high permeability is formed in a low permeability formation traversed by a well in which a body of finely divided aggregate or granular material and the like is arranged in the well below a casing to a point in the producing formation below a point therein which is to be fractured. A fracture is then formed in the formation below the casing by applying pressure to a body of fluid containing finely divided aggregate in suspension arranged above the body of aggregate in the well or by applying to the formation sufficient pressure to fracture same. The fracture is filled with aggregate by pumping the suspension into the fracture and aggregate is then removed from the well to a point below the point of the fracture. In accordance with the present invention a second fracture is then formed in the formation below the first fracture by applying pressure to said formation below said fracture or to a body of fluid containing finely divided aggregate in suspension above the aggregate remaining in the well. The second fracture is then filled with finely divided aggregate by pumping the suspension containing the aggregate into the second fracture. The sequence of operations may be repeated until a desired number of zones of high permeability has been formed in the formation.

The aggregate employed in the practice of the present invention is material termed in the trade as gravel or sand of uniform grade. This aggregate or finely divided granular material or gravel, as it is sometimes called, may be formed into a suspension of oil, fresh water or salt water all of which are substantially free of mud particles and used in the present invention.

In practicing the present invention a well is drilled to a point above the pay section where the oil string is set. The producing horizon is then drilled in through the oil string. The bit is then pulled and an open end tube or drill pipe run in the well bore. The open hole below the oil string is filled using a uniform grade of sand or gravel to a point immediately below the casing seat. Clean fluid, such as oil or fresh water or salt water, containing a uniform grade of sand or gravel is then pumped into the well at a sufficient pressure to fracture the formation. The fluid containing the uniform gravel is pumped in through the tubing string and if necessary additional fluid to supply sufficient velocity for movement of the granular material into the fracture may be pumped in on the annulus. Pumping in this manner is continued until fractures are formed and extended as far as possible and filled with the granular material and until maximum allowable injection pressure is reached. Thereafter the granular material or aggregate in the well bore below the formation which has been fractured is then reversed up into the tube or drill pipe by reverse circulation which exposes an additional interval of the formation which has not been fractured. The suspension of oil or water, as the case may be, containing the aggregate or granular material is then pumped into the formation in a similar manner thus fracturing the additional exposed formation and the granular material or aggregate is pumped into the fracture as has been previously described. The sequence of operations is repeated until the entire interval from the casing seat to the total depth traversing the producing formation has been fractured and the granular material or aggregate placed in the fractures.

The uniform grade of sand or gravel or granular material or aggregate, as it may be termed, in the well bore and that pumped into the fractures will not prevent flow of clean oil or water which is free of granular material. The pressure drop through the sand or gravel is sufficient to build up pressure and fracture the formation exposed to the pump pressure above the sand or gravel in the well bore. This pressure drop through the sand or gravel in the well bore and fractures is due to the limited cross-sectional area exposed and extremely high rate at which fluid is pumped in the present invention.

The invention will be further illustrated by reference to the drawing in which

The figure is a step-wise illustration of a preferred mode of operation.

Referring now to the drawing, a well 11 has been drilled to traverse a formation 12 from which it is desired to produce oil, gas, and the like. The well bore 11 has a casing 13 arranged therein which is sheathed with a cement sheath 14 which is conventional technique. The casing is landed on a casing seat 15 at its lower end. A tubing or drill pipe 16 which is open at its lower end is lowered into the well 11 to a point adjacent the casing seat 15 and a suspension of a granular material in oil or water is pumped downwardly through the tubing string 16 to deposit a bed 17 of granular material in the open well 11 below the casing seat 15, the suspension flowing downwardly through the tubing string 16 and upwardly in the casing through the annulus A defined by the tubing string 16 and the casing 13. After the bed of granular material has been arranged in the well 11, flow in the annulus A is reversed and flow of suspension through the tubing string 16 is continued. High pressure is imposed on the suspension flowing down the tubing string 16 and additional fluid, such as oil or water, is injected at the well head into annulus A. Thus it will be seen that in step 2 of the drawing that pressure is being exerted on the formation 12 by the suspension being pumped downwardly through the tubing 16 and by the fluid, such as oil or fresh water, injected into and pumped down the annulus A. In this manner a sufficient pressure is imposed on the formation 12 to lift the overburden 10 and to form lateral fractures 18 above the bed of granular material 17. In some cases vertical fractures may also be formed. Pumping is continued until the fractures 18 are extended outwardly into the formation 12 and until the fractures 18 are substantially completely filled with the granular material, such as indicated by numeral 19. After the fractures 18 have been formed and have been filled with the granular material 19, as shown in steps 2 and 3, flow through the tubing string 16 is reversed by discontinuing the flow of the suspension downwardly therein and flowing clean oil or water free of granular material downwardly through the annulus A such that a portion of the granular material 17 in the open hole 11 below the casing seat 15 is washed outwardly therefrom and up the tubing string 16 as shown by the arrows indicating the flow. Thus a portion of the granular material is removed and simultaneously the drill pipe or tubing string 16 is washed downwardly therein to a point immediately above a point where a second fracture or fractures may be formed below the first fracture 18.

In step 4 the operations of step 2 are repeated in that pressure is imposed on the suspension being flowed downwardly through the tubing string 16 and fluid under high pressure is injected in the annulus A causing the formation of second fractures 20 below the first fracture 18. Pumping down the annulus and through the tubing string 16 is conducted until the fractures 20 are extended outwardly in the formation 12 and until these fractures are filled with granular material indicated generally by the numeral 21. Thereafter the operation, such as described in steps 1 to 4, may be repeated until a desired number of fractures has been formed in the formation 12 or all of the producing formation has been selectively fractured or formed into a plurality of zones of high permeability.

While the invention has been described with respect to washing out the bed 17 by pumping down the annulus A, it will be apparent that the same end may be achieved by pumping down the tubing string 16 while lowering same and allowing the washed out material from bed 17 to proceed up the annulus A.

It will be clear from the foregoing description taken with the drawing that in my invention I dispense with the use of packers, straddle tools and the like for sealing off a formation. In highly fractured formations such as in the Spraberry area in West Texas, it is unusual for both packers of a straddle tool to form an effective seal at the same time and it is unusual to be able to fracture selectively formations of this type. Furthermore, in the prior art practices even if fracturing would occur the fracturing was insufficient to support the overburden which then dropped back and closed the fractures in the formation. In my invention by filling the fractures substantially completely with finely divided granular material or aggregate I am able to fracture selectively and to fracture in a plurality of zones in a producing formation. Thereafter production may be obtained from the fractures of high permeability in a low permeability formation.

The nature and objects of the present invention having been completely described and illustrated, what I wish to claim as new and useful and to secure by Letters Patent is:

1. A method for forming a plurality of zones of high permeability in a low permeability formation traversed by a well in a sequence of operations which comprises introducing into said well a sufficient amount of a granular material to fill said well to a point below a casing arranged in said well, pumping a fluid suspension of granular material into said well at a pressure sufficient to fracture said low permeability formation at a first point and to deposit granular material in the fractured formation, removing at least a portion of the granular material filling said well below the casing to a point below the point of said fractured formation, then pumping a second fluid suspension of granular material into said well at a pressure sufficient to fracture said low permeability formation at a second point above the remaining granular material filling said well and below the first point and to deposit granular material in the fractured formation at the second point, and repeating the sequence of operations until a desired number of zones of high permeability has been formed in said formation.

2. A method for forming a plurality of zones in a low permeability formation traversed by a well in a sequence of operations which comprises running an open end pipe into said well to a point below a casing arranged therein, introducing a sufficient amount of granular material into said well to form a bed of granular material in said well extending to a point just below said casing by pumping a fluid suspension of granular material downwardly through said pipe and upwardly through said casing, raising said open end pipe to a point above a point in said low permeability formation to be fractured, pumping a fluid suspension containing granular material downwardly in said well under a pressure sufficient to form at least a first fracture in said low permeability formation and to deposit granular material in said fracture, circulating a liquid downwardly through said casing and upwardly through said open end pipe and washing a portion of said bed of granular material from said well to a point below said first fracture while lowering said open end pipe in said well to a point below the first fracture, pumping a fluid suspension containing granular material downwardly in said well under a pressure sufficient to form at least a second fracture in said low permeability formation below the first fracture and to deposit granular material in said second fracture, and repeating the sequence of operations until a desired number of zones of high permeability has been formed in said formation.

3. A method for forming a plurality of zones of high permeability in a low permeability formation traversed by a well in a sequence of operations which comprises, locating a body of finely divided aggregate in said well below said casing arranged in said well to a point below a point in the producing formation which is to be fractured, introducing a body of fluid containing finely divided aggregate into said well above the body of aggregate, applying pressure to said body of fluid containing finely divided aggregate in suspension above the body of aggregate to form at least a first fracture in said low permeability formation and forcing said suspension into said first fracture to fill said first fracture with finely divided aggregate from said suspension, removing aggregate from said body of aggregate to a point below the point of said first fracture, introducing a body of fluid containing finely divided aggregate into said well above the body of aggregate remaining in the well, applying pressure to said body of fluid containing a finely divided aggregate in suspension above the aggregate remaining in the well to form at least a second fracture in said low permeability formation and forcing said suspension into said second fracture to fill said second fracture with finely divided aggregate, and repeating the sequence of operations until a desired number of zones of high permeability has been formed in said formation.

4. A method for forming a plurality of zones in a low permeability formation traversed by a well in a sequence of operations which comprises running an open end pipe into said well to a point below a casing arranged therein, introducing a sufficient amount of granular material into said well to form a bed of granular material in said well extending to a point just below said casing by pumping a fluid suspension of granular material downwardly through said pipe and upwardly through said casing, raising said open end pipe to a point above a point in said low permeability formation to be fractured, pumping a fluid suspension containing granular material downwardly in said well under a pressure sufficient to form at least a first fracture in said low permeability formation and to deposit granular material in said fracture, circulating a liquid downwardly through said open end pipe and upwardly through said casing and washing a portion of said bed of granular material from said well to a point below said first fracture while lowering said open end pipe in said well to a point below the first fracture, pumping a fluid suspension containing granular material downwardly in said well under a pressure sufficient to form at least a second fracture below the first fracture and to deposit granular material in said second fracture and repeating the sequence of operations until a desired number of zones of high permeability has been formed in said formation.

5. A method for forming a plurality of zones of high permeability in a low permeability formation traversed by a well in a sequence of operations which comprises, locating a body or finely divided aggregate in said well below a casing arranged in said well to a point below a point in the producing formation which is to be fractured, arranging a body of fracturing fluid in said well above the body of aggregate, applying a sufficient amount of pressure to said body of fracturing fluid to fracture said formation and form at least a first fracture in said formation, forcing a fluid carrying an aggregate into the fractured formation to fill said first fracture with aggregate, removing at least a portion of the aggregate from the body of aggregate in said well to a point below the point of said first fracture, arranging a second body of fracturing fluid in said well above the body of aggregate remaining in the well, applying pressure to said second body of fracturing fluid arranged above the remaining body of aggregate in an amount sufficient to fracture said formation and to form at least a second fracture, forcing a fluid carrying an aggregate into the fractured formation to fill said second fracture with finely divided aggregate, and repeating the sequence of operations until a desired number of zones of high permeability has been formed in said formation.

6. A method for obtaining production from a plurality of zones of high permeability in a low permeability formation traversed by a well in a sequence of operations which comprises, locating a body of finely divided aggregate in said well below a casing arranged in said well to a point below a point in the producing formation which is to be fractured, arranging a body of fracturing fluid substantially free of mud particles in said well above the body of aggregate, applying a sufficient amount of pressure to said body of fracturing fluid to fracture said formation and form at least a first fracture in said formation, forcing a fluid carrying an aggregate into the fractured formation to fill said first fracture with aggregate, removing at least a portion of the aggregate from the body of aggregate in said well to a point below the point of said first fracture, arranging a second body of fracturing fluid substantially free of mud particles in said well above the body of aggregate remaining in the well, applying pressure to said second body of fracturing fluid arranged above the remaining body of aggregate in an amount sufficient to fracture said formation and to form at least a second fracture, forcing a second fluid carrying an aggregate into the fractured formation to fill said second fracture with aggregate, repeating the sequence of operations until a desired number of zones of high permeability has been formed in said formation, and obtaining production from said zones of high permeability.

References Cited in the file of this patent

UNITED STATES PATENTS

| Number | Name | Date |
|---|---|---|
| 2,221,261 | Lehnhard | Nov. 12, 1940 |
| 2,223,397 | White et al. | Dec. 3, 1940 |
| 2,354,570 | Benckenstein | July 25, 1944 |
| 2,596,843 | Farris | May 13, 1952 |

FOREIGN PATENTS

| Number | Country | Date |
|---|---|---|
| 10,926 | Great Britain | of 1912 A. D. |